United States Patent [19]

Duffy

[11] Patent Number: 4,714,413
[45] Date of Patent: Dec. 22, 1987

[54] SPEED SENSITIVE POWER STEERING PUMP UNLOAD VALVE

[75] Inventor: James J. Duffy, Livonia, Mich.

[73] Assignee: Ford Motor Company, Dearborn, Mich.

[21] Appl. No.: 386,850

[22] PCT Filed: Apr. 16, 1982

[86] PCT No.: PCT/US82/00486

§ 371 Date: Apr. 16, 1982

§ 102(e) Date: Apr. 16, 1982

[87] PCT Pub. No.: WO83/03581

PCT Pub. Date: Oct. 27, 1983

[51] Int. Cl.⁴ .................... F04B 49/02; F04B 49/00
[52] U.S. Cl. .................................. 417/293; 417/310;
417/300; 180/142; 180/143
[58] Field of Search ............... 417/293, 300; 180/142, 180/143

[56] References Cited

U.S. PATENT DOCUMENTS

| | | | |
|---|---|---|---|
| 1,847,229 | 3/1932 | Swanson et al. | 417/293 |
| 3,314,495 | 4/1967 | Clark et al. | 180/79.2 |
| 3,690,400 | 9/1972 | Uchiyama et al. | 180/79.2 |
| 3,692,137 | 9/1972 | Inoue | 180/79.2 R |
| 3,744,515 | 7/1973 | Inoue | 180/143 |
| 4,085,657 | 4/1978 | Keruagoret | 91/380 |
| 4,119,172 | 10/1978 | Yanagishima et al. | 180/142 X |
| 4,199,304 | 4/1980 | Strikis et al. | 417/310 |
| 4,244,389 | 1/1981 | Shimoura et al. | 137/117 |
| 4,300,650 | 11/1981 | Weber | 180/143 X |
| 4,320,812 | 3/1982 | Takaoka et al. | 180/143 |

FOREIGN PATENT DOCUMENTS 54-53427  4/1979  Japan ........................... 180/142

Primary Examiner—William L. Freeh
Attorney, Agent, or Firm—Donald J. Harrington; Keith L. Zerschling

[57] ABSTRACT

A positive displacement pump for a vehicle power steering system comprising a rotor (42) rotatable in and cooperating with a stator (20) to define a pump cavity (52), (54), inlet and outlet ports (56), (58) and (34), (36) communicating with the pump cavity and a flow control valve (96) located in the flow delivery circuit wherein provision is made for opening the flow delivery circuit to a bypass circuit (72) upon an increase in the speed of the vehicle beyond a design point thereby reducing the pump back pressure and power usage which results in increased "road feel" at increased speeds while maintaining normal power assist during steering maneuvers at low speeds.

6 Claims, 6 Drawing Figures

SPEED SENSITIVE POWER STEERING PUMP UNLOAD VALVE

TECHNICAL FIELD

My invention comprises improvements in a positive displacement power steering pump of the kind shown in U.S. Pat. No. 4,199,304, which issued on Apr. 22, 1980 to the assignee of my invention. Such pumps are used in power steering systems for motor vehicles.

BACKGROUND ART

I am aware of certain prior art patents that describe flow control valves for pumps that are speed sensitive, one being U.S. Pat. No. 4,244,389. That patent comprises a flow control valve having a variable orifice, the effective area of the orifice depending upon the position of the spool valve as seen in FIGS. 1 and 2 of the drawings for that patent. The valve moves, however, in accordance with pump speed or engine speed to vary the flow of fluid to the steering gear. The valve has no road speed sensitive function for eliminating the power assist at a selected design speed as in the present disclosure.

U.S. Pat. No. 3,314,495 shows a well known flow control valve having a so-called drooper pin, best seen in FIG. 6 of that patent. The drooper pin is located in a flow control orifice that communicates with the fluid supply passage for a power steering gear. As the valve spool moves, the metering pin also moves; and its tapered area registers with the orifice to provide a variable effective orifice restriction. As the pump speed changes, the pressure of the fluid in the spring chamber for spring 34C for the construction of FIG. 6 of that patent is reduced by the venturi effect of the increased flow upon an increase in pump speed.

Power steering gear valves, as distinct from power steering pump valves, are shown in U.S. Pats. Nos. 3,690,400 and 3,692,137. These control the magnitude of the pressure in a reaction chamber for a power steering gear. They sense a speed signal, but they are effective only to influence the magnitude of the torque reaction during steering maneuvers and are not effective to reduce pump horsepower loss of the associated power steering pump and to eliminate the power assist at high speeds.

Another power steering system valve shown in U.S. Pat. No. 4,085,657 comprises a differential pressure operated valve that acts in a power steering gear fluid circuit to alter the fluid flow to the steering gear thus changing as desired the characteristic relationship of pressure to steering effort.

DISCLOSURE OF THE INVENTION

The power steering pump shown in U.S. Pat. No. 4,199,304 comprises a rotor assembly having multiple slipper pump elements that register with cam surfaces formed in a cam ring secured to the pump housing. The rotor is drivably connected to an engine driven pump drive shaft.

The cam ring cooperates with the rotor to define two crescent pump cavities spaced in 180° relative angular disposition. An inlet port and an outlet port are provided for each cavity so that two pumping strokes occur for each revolution of the rotor. The outlet ports supply a common flow control valve which maintains a constant flow in a flow delivery passage that communicates with a power steering fluid motor. The flow control valve comprises a valve spool that controls the degree of communication between each fluid outlet port and bypass flow passage communicating with the inlet side of the pump.

In the particular embodiment described in this specification the valve is located in a pump valve plate in which the valve porting is formed. The valve plate is situated against an end plate that registers with one side of the rotor and the side of the cam ring. The opposite side of the rotor and cam ring is engaged by a second end plate. Fluid pressure and spring force urge the end plates, the cam ring and the valve plate into stacked registry.

The valve spool is subjected to a calibrated spring force and to the pressure developed at the outlet ports. It is subjected also to a venturi pressure force that is developed by a flow venturi located in the flow distribution passage. The pressure at the throat of the venturi acts on the side of the pump engaged by the valve spring while the upstream side of the venturi corresponds to the pressure developed at the valve outlet ports.

The valve assembly includes also a vehicle speed sensing pressure relief valve that exhausts the side of the valve on which the valve spring acts. When the valve is closed, the spool valve acts in the usual way to control the pump flow throughout the rotor speed range. At a speed above a preselected value, such as 15 miles per hour, the speed sensitive valve exhausts the spring chamber of the flow control valve thereby reducing pump pressure and reducing the parasitic pump horsepower loss at high road speeds and eliminating power assist while increasing vehicle steering road "feel".

In a working embodiment of my invention the speed sensitive valve comprises a check valve located in the valve housing that contains the flow control valve and a solenoid actuator for opening the check valve against the opposing force of the check valve spring when the vehicle speed exceeds approximately 15 miles per hour. The solenoid in this working embodiment is secured to the fluid reservoir for the pump and the armature for the solenoid acts directly on the check valve element within the valve body for the flow control valve. No additional space is required to accommodate the pump, and the function of the speed sensitive valve can be introduced into the pump without adding appreciable cost or complexity to the pump design.

BEST MODE FOR CARRYING OUT THE INVENTION

Figure 1:
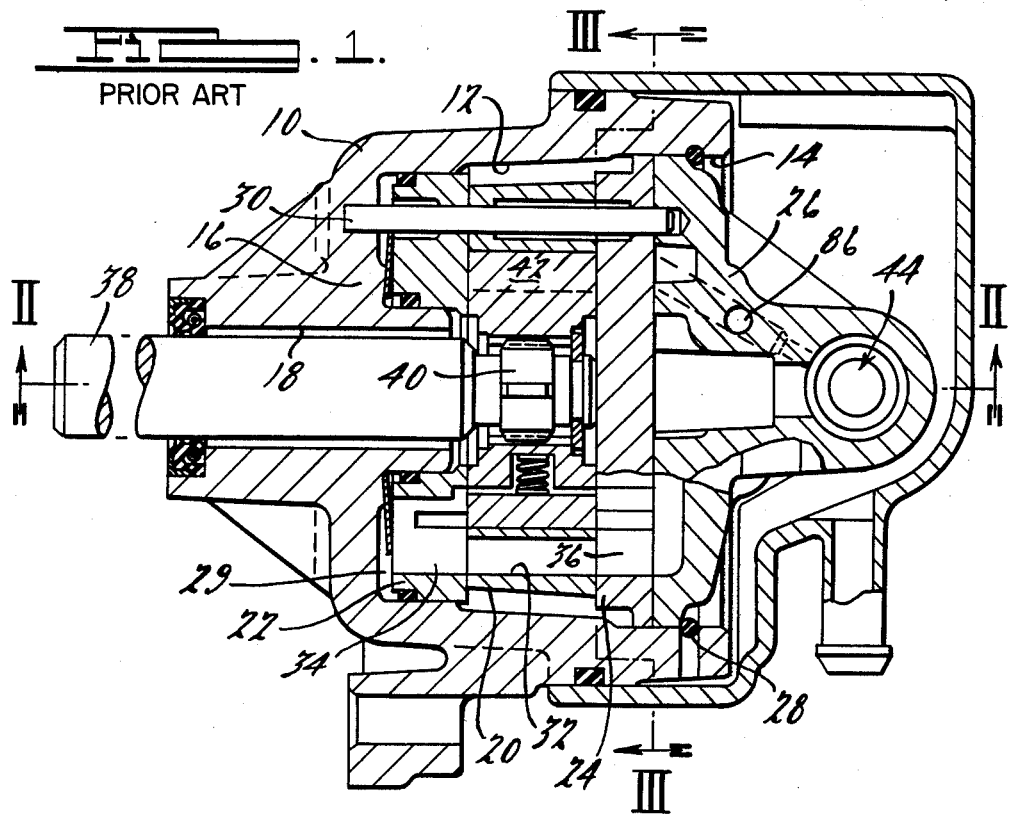
FIG. 1 shows in longitudinal cross section a prior art power steering pump capable of embodying the improvements of my invention.

In FIG. 1 a power steering pump housing 10 is provided with a cavity 12 having an end opening 14 and a closed end 16. A drive shaft opening is formed in the end 16 as shown at 18.

A pump cam ring 20 is located in the opening 12. A first end plate 22 is situated between the cam ring 20 and the housing end 16. The opposite side of the cam ring 20 is engaged by end plate 24. A closure plate 26 is positioned in the open end 14 adjacent the end plate 24 and is held in place by snap ring 28. Locator pins 30 extend through the cam ring and through the end plates to maintain proper angular registry between them.

A pressure chamber 29 is defined by the pump housing and by end plate 22. It communicates with the high pressure side of the pump through internal passages in the cam ring and the side plates as seen at 32, 34 and 36, which passages communicate with the outlet port for the pump.

The main drive shaft 38 extends through the opening 18. It includes a drive spline portion 40 which drivably engages an internally splined opening in the rotor 42.

The end plate 26 serves as a valve body for a flow control valve assembly indicated generally by reference character 44.

Figure 3:
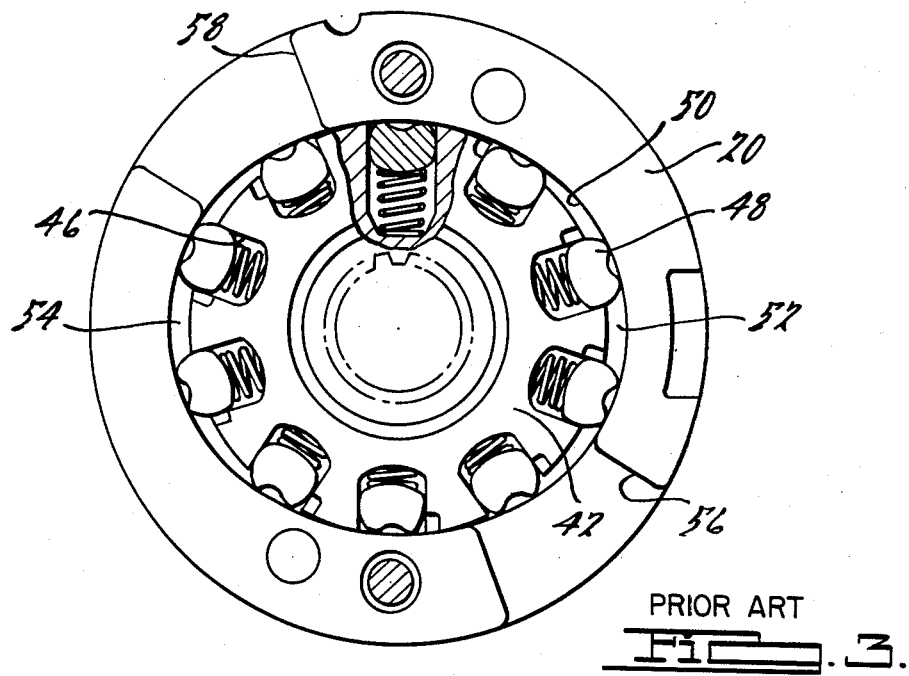
FIG. 3 is a cross-sectional view showing the cam and rotor assembly for the construction of FIG. 1 as seen from the plane of section line 3—3 of FIG. 1.
Figure 4:
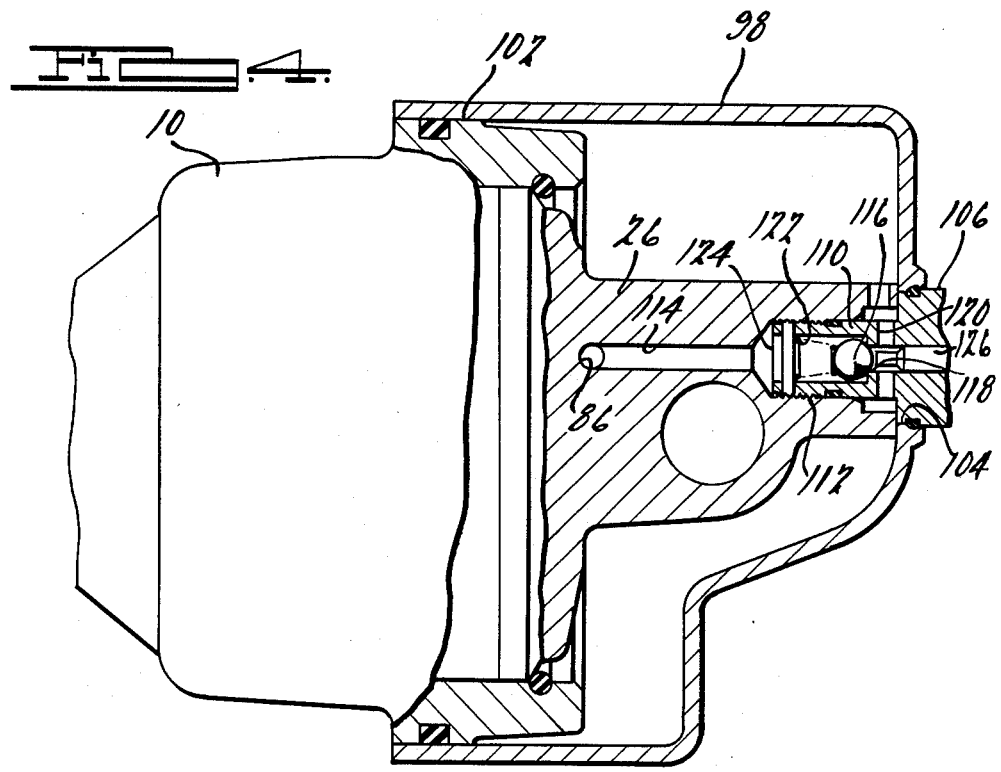
FIG. 4 is a view showing in partial outline the pump construction of FIG. 1 with a part of of my improved valve shown in cross section.

As seen in FIG. 3, the rotor 20 comprises a plurality of angularly spaced recesses 46, each of which receives a slipper pumping element 48. The slippers 48 engage the internal cam surface 50 of the cam ring 20. The cam surface 50 is oblong, as seen in FIG. 3 with its major axis shown horizontal in FIG. 3 and the minor axis shown vertical. An inlet port and at outlet port communicate with the pumping space 52, and a second inlet port and a second outlet port communicate with pumping space 54. The inlet ports are shown in FIG. 4 at 56 and 58, respectively. The outlet ports are formed by the side plates 22 and 24.

Figure 2:
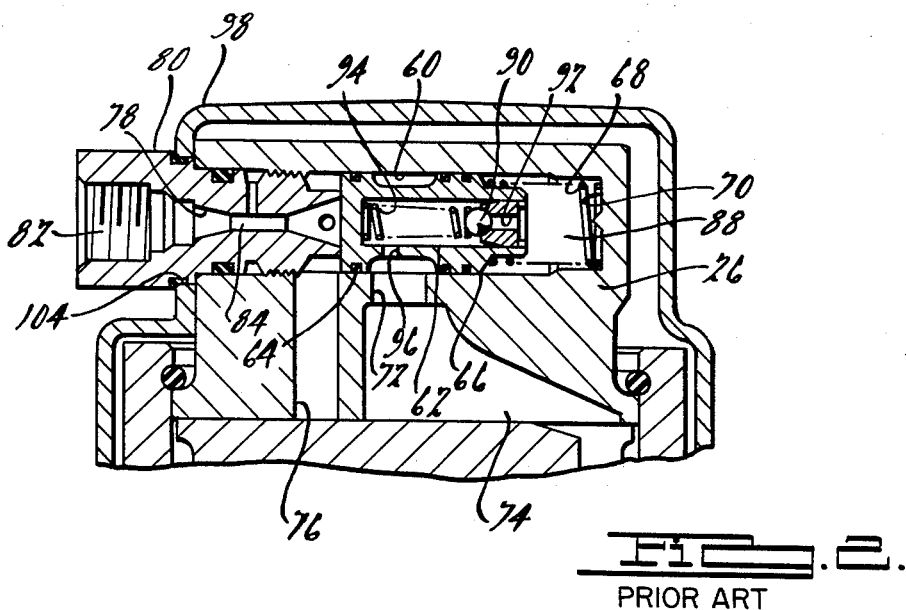
FIG. 2 is a cross-sectional view of the valve body of the construction of FIG. 1 as seen from the plane of section line 2—2 of FIG. 1.

I have shown the flow control valve more particularly in FIG. 2. It includes a valve bore 60 formed in end plate 26. A valve spool 62 having two spaced lands 64 and 66 is positioned slidably in the valve bore 60. The valve spool 62 is urged in a left hand direction by valve spring 68 seated at the end 70 of the valve bore. A bypass port 72 communicates with the valve bore 60 and the inlet port 74. A high pressure passage 76 extends from the high pressure outlet ports of the pump to the left hand side of the valve bore 60 so that the outlet pressure of the pump acts on the left hand surface of valve land 64.

Spring 68 normally tends to decrease the degree of communication between high pressure passage 76 and the bypass port 72. The left hand side of the valve chamber 60 communicates with the right hand side or the inlet side of a flow venturi 78 formed in fluid fitting 80 which is threadably received in the left hand end of the valve bore 60. The outlet side of the venturi passage 78 is connected to the flow delivery passage of a power steering system, which is connected to the fitting by a threaded connection 82.

The throat of the venturi passage 84 communicates with a cross-over passage as shown in FIG. 1 at 86. This passage extends to the right hand end of the valve body occupied by the spring 68. That end, which may be referred to as the spring chamber, is identified in FIG. 2 by reference numeral 88. A pressure relief valve 90, which normally is closed except under extreme pressure conditions, is in the interior of valve spool 96, which communicates with inlet port 74. Relief valve 90 is urged by spring 94 into registry with orifice 92.

Figure 5:
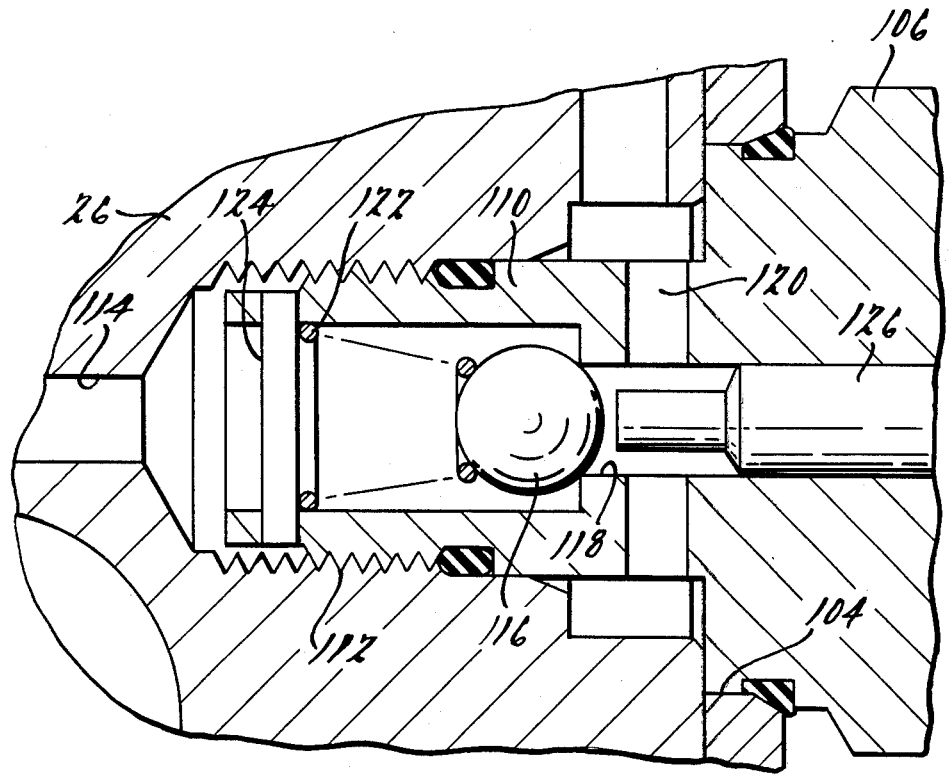
FIG. 5 is an enlarged view of the relief valve and solenoid actuator shown in the assembly of FIG. 4.

In FIG. 5, I have shown a cross-sectional view of the end plate 26 as seen in FIG. 4. The end plate 26 is enclosed by a reservoir cover 98. This is seen also in the cross-sectional view of FIG. 2. One side of the reservoir cover 98 is open and encircles the periphery 102 of the pump housing 10. The venturi element 80 is received through an opening 104 in one side of the reservoir cover 98. The rear of the reservoir cover 98 has a second opening 104 which receives therein a mounting stem 106 of a solenoid operated valve designated generally in FIG. 6 by reference numeral 8. Connected to the stem 106 is an externally threaded valve housing 110 which is threadably received in an internally threaded opening 112 in the housing 26. The inboard end of the opening 112 communicates through passage 114 with the cross-over venturi throat pressure passage 86.

A check valve element 116 located in the opening 112 is urged against a valve seat surrounding orifice 118, the latter communicating through radial passages 120 with the interior of the reservoir cover 98. Spring 122 urges the ball to a seated position and spring 122 is seated on a retainer pin 124 located in the opening 112.

A solenoid core extension 126 extends through the orifice 118 and is adapted to move the valve element 116 off its seat when it is urged in a left hand direction. A valve unseating force is imparted to the extension 126 by a solenoid operator indicated in FIG. 6 at 108. The solenoid operation 108 comprises a solenoid winding 128 in an armature 130 the latter being connected to the extension 126.

Figure 6:
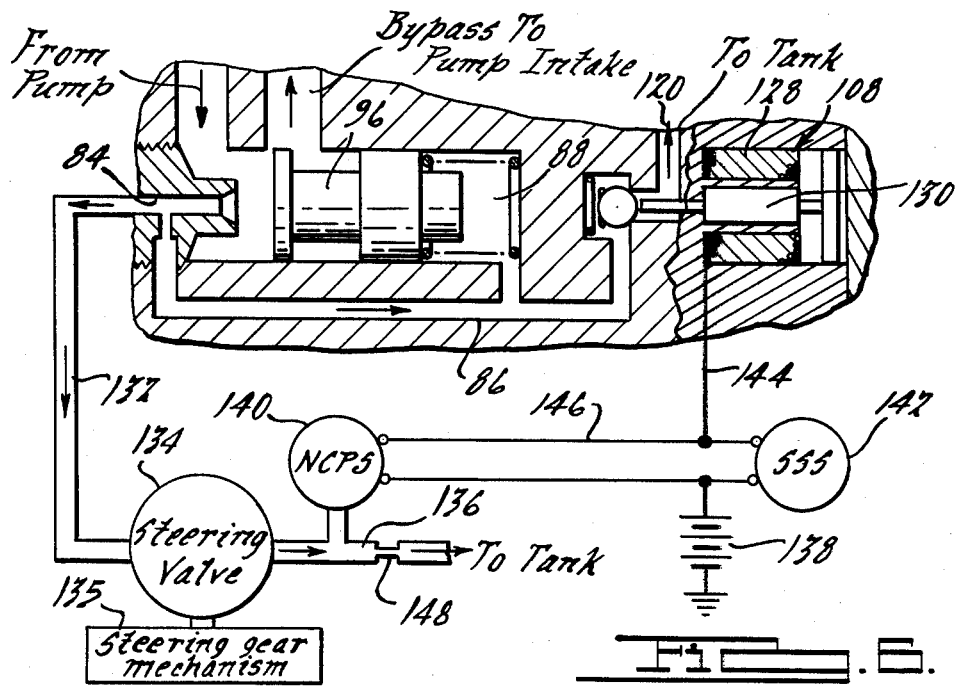
FIG. 6 is a schematic diagram of my improved power steering system flow control valve and solenoid operated vehicle speed sensitive valve.

As seen in FIG. 6 the delivery passage 132 is connected to the venturi element 80, and its extends to the power steering valve 134. The fluid circulated through the valve supplies steering gear mechanism 135 and is returned to the tank or reservoir through passage 136.

The electrical circuit for the solenoid 108 comprises a voltage source 138, a normally closed pressure switch 140 and a speed sensitive switch 142. The positive side of the voltage source 138 is connected to the solenoid windings 134 through electrical lead 144. A parallel lead 146 completes a circuit between the ground side of the voltage source 138 and the solenoid windings whenever it is closed. It is closed incidentally during a turning maneuver of the vehicle so that the solenoid remains energized when the steering valve is closed and there is no pressure at the switch. If the steering valve is closed during power steering, the switch 140 closes and the solenoid cannot overcome pressure on the ball. Pressure on the ball also prevents a shift from power to manual steering during a steering maneuver.

Switch 142 bypasses the switch 140. At speeds above a preselected value, such as 10 to 15 miles per hour, the switch 142 is closed and the solenoid is energized thus venting the valve spring chamber 88. The valve spool 96 then becomes a simple pressure relief valve and maintains a constant low pressure on the discharge side of the pump. At speeds below the critical value of 10 or 15 miles per hour, switch 142 is opened so the solenoid is deenergized; and the valve spool 96 functions in the usual fashion as it responds to the pressure differential created by the venturi pressure in the throat 84 of the venturi.

A shift from manual steering to power steering during a steering maneuver is prevented by the switch 140 which is installed in the power steering valve return passage 136 on the upstream side of orifice 148. During straight ahead driving, steering valve 134 is opened; and pressure at the switch keeps it open thus permitting the speed sensor switch 142 to deenergize the solenoid when the speed decreases to a value below the predetermined value, thus restoring full power assist.

INDUSTRIAL APPLICABILITY

This invention is useful in power steering systems for automotive vehicles wherein the vehicle engine drives the power steering pump, and the pump acts as a pressure source for a fluid motor that augments the steering effort of the drive during steering maneuvers.

I claim:

1. In a power steering system having a fluid pressure operated steering valve and a steering gear mechanism, a power steering pump and a fluid circuit interconnecting the pump and the steering valve, the improvement comprising:

a pressure regulating flow control valve for the power steering pump;

said pump having a high pressure flow delivery passage and a low pressure return passage;

said flow control valve being situated in and partly defining said circuit for establishing controlled communication between said high pressure passage and said return passage;

means for subjecting a pressure differential force on said flow control valve that is proportional in magnitude to the fluid flow delivered by said pump whereby an increased fluid flow delivery by the pump is accompanied by an increase in the pressure forces tending to increase bypass flow from said delivery passage to said return passage;

and vehicle speed sensitive valve means for deactivating said flow control valve by eliminating the flow proportional differential force acting on said flow control valve at speeds greater than a predetermined value whereby the flow control valve acts solely as a pressure regulator bypass valve.

2. The combination as set forth in claim 1 wherein said speed sensitive valve means comprises a relief valve that is normally closed and that communicates with said flow control valve, and a solenoid actuator comprising an armature adjacent said relief valve and adapted to engage the same when it is moved in one direction and a solenoid winding which, when energized, urges said armature to a relief valve opening position.

3. The combination as set forth in claim 1 wherein said flow control valve comprises a valve spool;

a valve spring acting on one side of said valve spool and tending to urge the same in one direction to decrease the degree of communication between said delivery passage and said return passage;

and a flow sensitive pressure signal means for distributing a flow proportional pressure differential force on said valve spool;

said speed sensitive valve means exhausting the pressure distributed to said one valve spool side at speeds greater than a predetermined value.

4. The combination as set forth in claim 3 wherein said speed sensitive valve means comprises a relief valve that is normally closed and that communicates with said flow control valve, and a solenoid actuator comprising an armature adjacent said relief valve and adapted to engage the same when it is moved in one direction and a solenoid winding which, when energized, urges said armature to a relief valve opening position.

5. The combination as set forth in claim 3 wherein said flow sensitive pressure signal means comprises a throat venturi in said flow delivery passage;

a pressure cross-over passage connecting the throat of the venturi with said one side of said valve spool;

said speed sensitive valve means being adapted to open the cross-over passage to exhaust when the vehicle speed exceeds a predetermined value.

6. The combination as set forth in claim 5 wherein said speed sensitive valve means comprises a relief valve that is normally closed and that communicates with said flow control valve, and a solenoid actuator comprising an armature adjacent said relief valve and adapted to engage the same when it is moved in one direction and a solenoid winding which, when energized, urges said armature to a relief valve opening position.

* * * * *